United States Patent [19]

Bjorkman, Jr.

[11] Patent Number: 5,388,753
[45] Date of Patent: Feb. 14, 1995

[54] INERT GAS WELDING SHIELD FOR THE BACKSIDE OF WELDS

[75] Inventor: Gerald W. Bjorkman, Jr., Madison, Ala.

[73] Assignee: Martin Marietta Corporation, Bethesda, Md.

[21] Appl. No.: 215,742

[22] Filed: Mar. 21, 1994

[51] Int. Cl.⁶ ............................................. B23K 9/16
[52] U.S. Cl. ........................................... 228/42; 219/74
[58] Field of Search .................. 228/42; 219/74, 121.33

[56] References Cited

U.S. PATENT DOCUMENTS

| 1,746,081 | 2/1930 | Hobart | 219/74 |
| 2,918,563 | 12/1959 | Ternisien et al. | 219/74 |
| 4,812,611 | 3/1989 | Carleton | 219/74 |
| 4,956,537 | 9/1990 | Schnorrer | 219/74 |

FOREIGN PATENT DOCUMENTS

| 3835707 | 3/1990 | Germany | 219/74 |
| 61-289971 | 12/1986 | Japan | 219/74 |
| 1323318 | 7/1987 | U.S.S.R. | 219/74 |

Primary Examiner—P. Austin Bradley
Assistant Examiner—Jeffrey T. Knapp
Attorney, Agent, or Firm—John R. Duncan; Frank D. Gilliam

[57] ABSTRACT

A shield protects the back side of a molten and solidifying weld on a structure being welded from the deleterious effects of ambient gases, such as oxygen and nitrogen. The shield is in the form of a continuous tubular chamber surrounding an open central area, allowing clear viewing of the weld. The chamber is bounded by two spaced skins and inner and outer walls extending between the skins. An inert gas can be introduced into the chamber under pressure. One skin is generally planar and perforated, allowing the gas to exit the chamber. In use, the chamber is secured to a welding device for movement therewith, with the central opening opposite the weld head and the perforated skin adjacent to the panel being welded. As welding proceeds, an inert gas is fed into the chamber and escapes through the perforations and passes into the central area, preventing entry of ambient air which would contaminate the weld during welding and solidification of the weld.

36 Claims, 4 Drawing Sheets

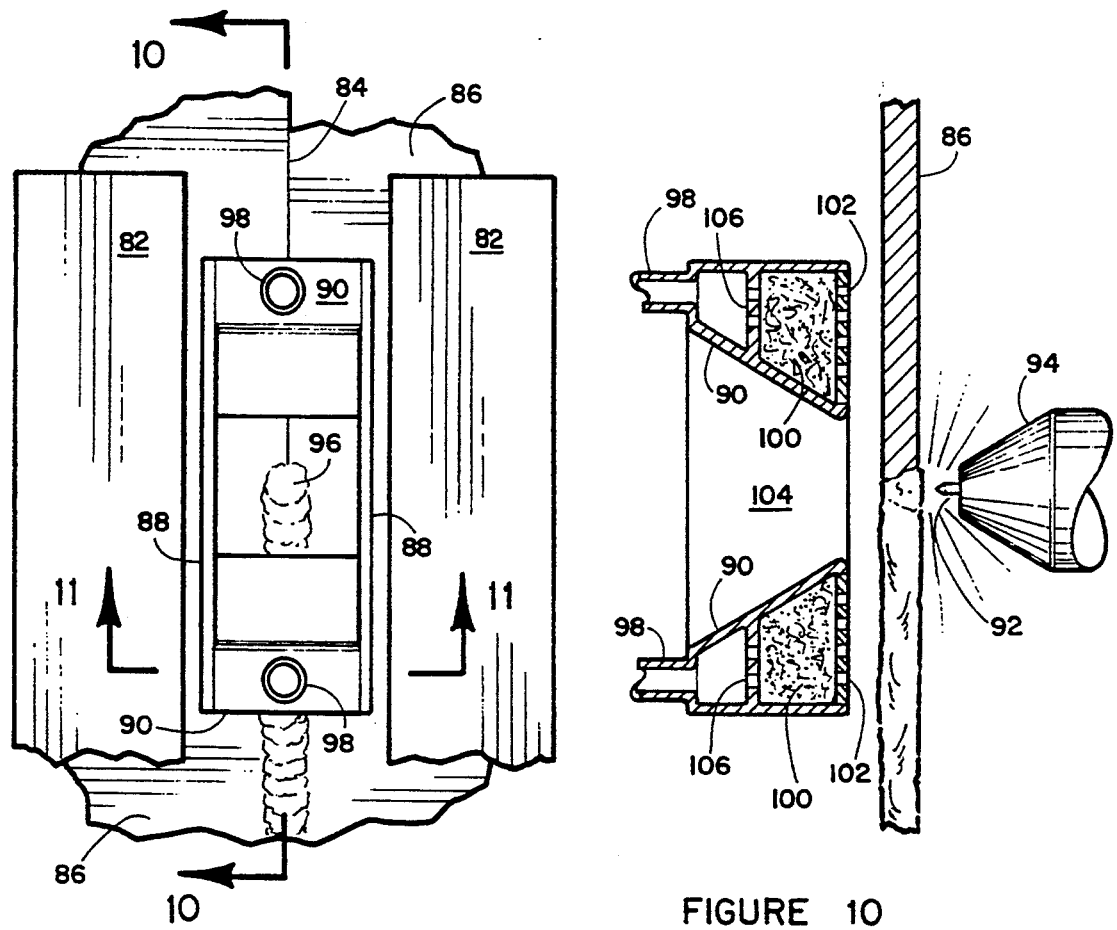
FIGURE 9
FIGURE 10
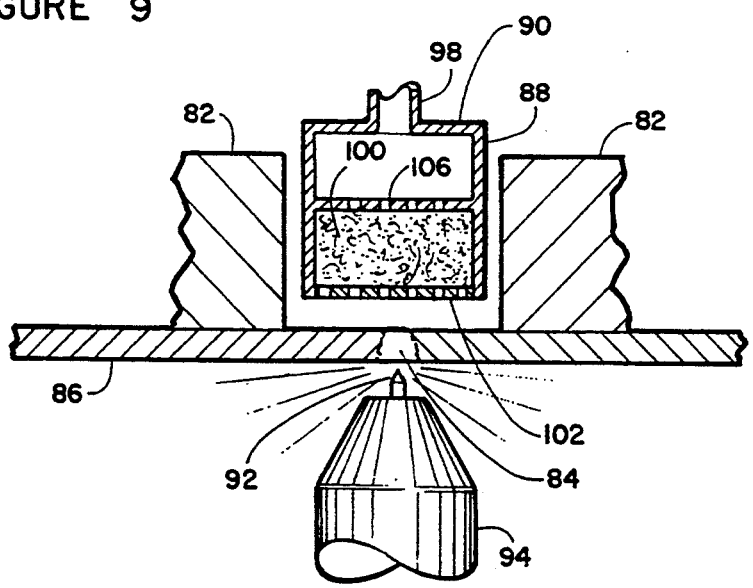
FIGURE 11

INERT GAS WELDING SHIELD FOR THE BACKSIDE OF WELDS

BACKGROUND OF THE INVENTION

This invention relates in general to welding of metals which require protection from ambient gases during welding and, more particularly, to a backside shield adapted to maintain an inert gas over the welding area during and immediately after welding.

During fusion welding of many metals, such as aluminum, aluminum-lithium, titanium, and others, gaseous elements (e.g., oxygen and nitrogen) in the ambient air will react with the molten or hot metal to form oxides and other compounds that disadvantageously affect the physical properties of the weld. It is necessary to exclude these gaseous elements from the weld area until the weld has cooled to the point where contamination can no longer occur.

In the past, this problem was overcome in welding processes such as tungsten arc welding, plasma arc welding and the like, by covering the weld area on both the front and back sides of the weld with an inert atmosphere to exclude ambient air. This could typically achieved in two ways. First, the welding head and the parts being welded can be contained in an enclosure that is filled with an inert gas during welding. While effective when welding small parts, this method is not feasible for welding very large structures, such as large aluminum-lithium space vehicle propellant tanks. In a second method for excluding gases from the weld area, the front side of the weld is shielded with the assistance of a trailing shield device and the backside of the weld is shield with a purge box mounted over the back of the weld joint.

Trailing shields are often used to cover both the front side of a weld area when a highly contaminant sensitive material is being welded. These trailing shields are essentially small boxes positioned over the weld area just behind the weld torch to shield the solidifying weld puddle. Shielding gas, such as helium, argon or a mixture thereof is routed into a small box like device and diffused out onto; the solidifying weld and part surface.

Backside shields or purge boxes may be used to cover the back side of the weld joint during welding. Stationary purge boxes are typically used with small structures. With large structures, the purge boxes are typically mounted so as to travel with the weld torch.

There are, however, a number of problems with these conventional box-like purge devices. Often it is necessary to inspect the weld bead as it forms and control the path of the weld torch from the back side of the weld. Automated systems, using laser sensors or television cameras, are unable to perform these tasks because the box-like device is closed to proper viewing. In addition the box design requires equipment for monitoring shield gas pressure and oxygen content inside the purge device chamber, which complicates the welding operation and increases the probability of weld defects.

Thus, there is a continuing need for improved devices for shielding the backside of welds against contamination from ambient air while permitting inspection of the weld as it is formed.

SUMMARY OF THE INVENTION

The above-noted problems, and others, are overcome in accordance with this invention by a backside shield for use in welding which basically includes a tubular chamber surrounding an open central area, adapted to be secured to the weld puddle. That open central area defines a through-opening in said shield. The tubular chamber is formed from two spaced annular skins with inner and outer walls extending between the skins.

One skin is perforated and, in use, is closely spaced from the backside of the panels being welded. An inert gas is introduced into the chamber through at least one tube and exits through the perforations, passing along the space between the perforated skin and panels being welded. The inert gas enters and fills the central area, keeping ambient air away from the weld during weld forming, solidification and initial cooling. While the perforations may have any suitable shape, size and distribution, for best results the perforations have maximum widths of from about 0.05 to 0.08 inch with the perforations make up from about 20 to 40 per cent of the second skin area. Optimally, the perforations should be about 0.063 inch in diameter and make up about 30 per cent of the skin area. While round perforations are preferred, other shapes may be used as desired. The skin may be formed from any suitable material, such as perforated metal sheets, porous ceramic sheets and sintered stainless steel sheets.

In one embodiment, the shield has a rectangular shape, having an open central area of a length selected in accordance with the weld tool design and backside weld vision system requirements. Preferably, the inner wall of the shield is angled outwardly so as to provide a wide, clear view of the newly formed weld.

In a second embodiment, the shield is circular, with circular tubular inner and outer walls.

In a third embodiment, the shield has a rectangular shape with two spaced chambers at the narrow ends of the rectangle and solid walls along the narrow sides connecting the two chambers in a box-like configuration. This configuration is particularly desirable for use with narrow weld fixtures and takes advantage of the weld fixture wall to isolate the shield gas in the open central area of the device.

It is, therefore, an object of the invention as summarized above to provide a backside welding shield which will fully protect a weld from contamination by ambient air. Another object of the invention is to provide a backside welding shield of simple and sturdy construction capable of being moved along the moving weld area by conventional continuous welding machines. Still another object is to provide weld shield system that does not require monitoring equipment for shield gas pressure and oxygen content. A further object is to provide a backside welding shield which permits convenient examination of the weld from the backside during formation by optical sensing and control devices.

The backside welding shield may be used with any suitable welding system, such as plasma welding, tungsten arc welding and the like. Any suitable weld observation and control system, using television, laser or other sensor means, may be used with this backside welding shield.

BRIEF DESCRIPTION OF THE DRAWING

Details of the invention, and of certain preferred embodiments thereof, will be further understood upon reference to the drawing, wherein:

FIG. 9 is a plan view of a third embodiment of the backside shield;

FIG. 10 is a section view taken on line 10—10 in FIG. 9; and

FIG. 11 is a section view taken on line 11—11 in FIG. 9.

DETAILED DESCRIPTION OF PREFERRED EMBODIMENTS

Figure 1:
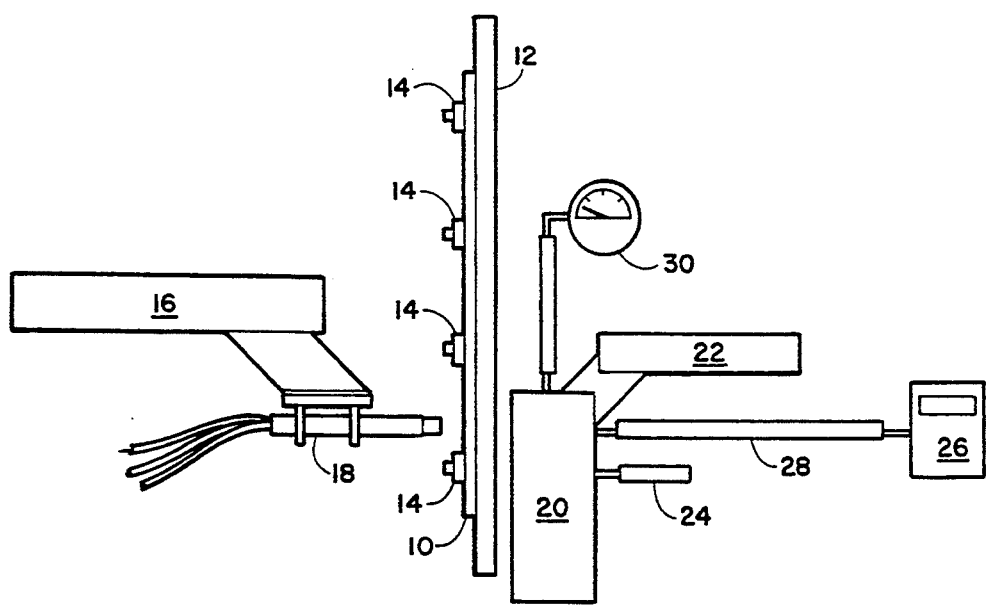
FIG. 1 is a schematic vertical section through a welding assembly using the backside shield of this invention.

Referring now to FIG. 1, there is seen a schematic section view through a typical welding apparatus, using the backside shield of this invention. A structure 10 to be welded, typically two abutting panels of suitable metal, such as aluminum or aluminum-lithium, is secured to a weld fixture plate 12 by a weld clamp array 14. Weld fixture plate is a single piece having a slot open down its center over which the abutting edges of the panels to be welded are positioned. A weld manipulator 16 holds a welding torch 18 adjacent to the line to be welded. Manipulator 16 may be any conventional means for moving torch 18 along the weld line. Typically, manipulator 16 may be under computer control to follow a fixed pattern, or may use computer control with feedback from sensors (not shown) that detect and follow the abutting edges of structure 10 and direct manipulator 16 to follow that line. In addition, sensors may continuously observe the weld as it is formed through the backside shield as detailed below to provide precise manipulator adjustment signals.

The backside shield 20 of this invention is mounted on a travel device 22 which is mechanically or electrically connected to manipulator 16 for movement therewith, so that shield 20 will always be positioned precisely opposite welding torch 18. The shield is closely spaced to the weld line, adjacent to the slot in weld fixture 12.

The shield gas is introduced into shield 20 through tube 24. Any suitable inert gas may be used. Typical inert gases include helium, argon, and mixtures thereof.

A pressure gage 30 connected to the plenum of shield 20, as detailed below, may be provided to assure that the pressure of the inert gas is sufficient to provide the desired flow rate to the weld area.

Figure 2:
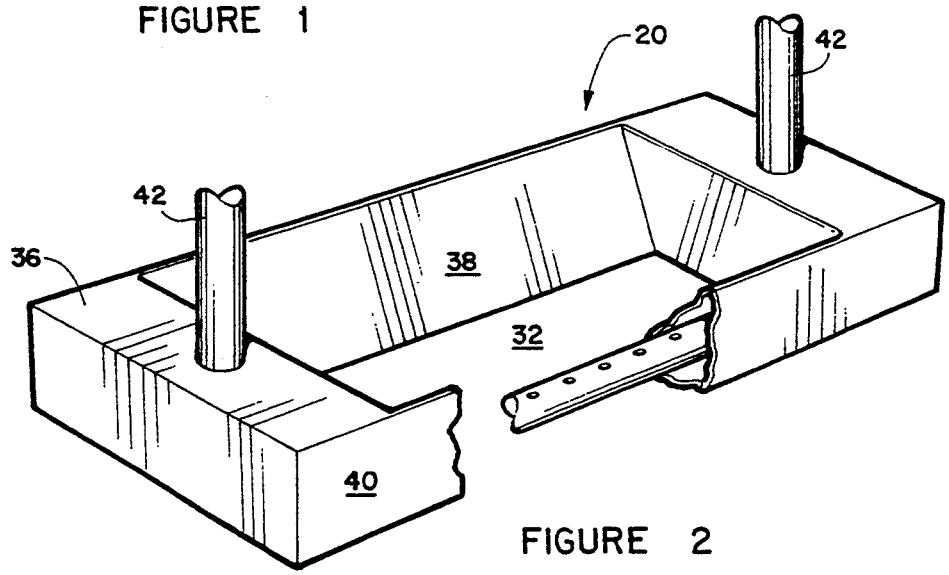
FIG. 2 is a perspective view of a first, rectangular, embodiment of the backside shielded of FIG. 1.
Figure 3:
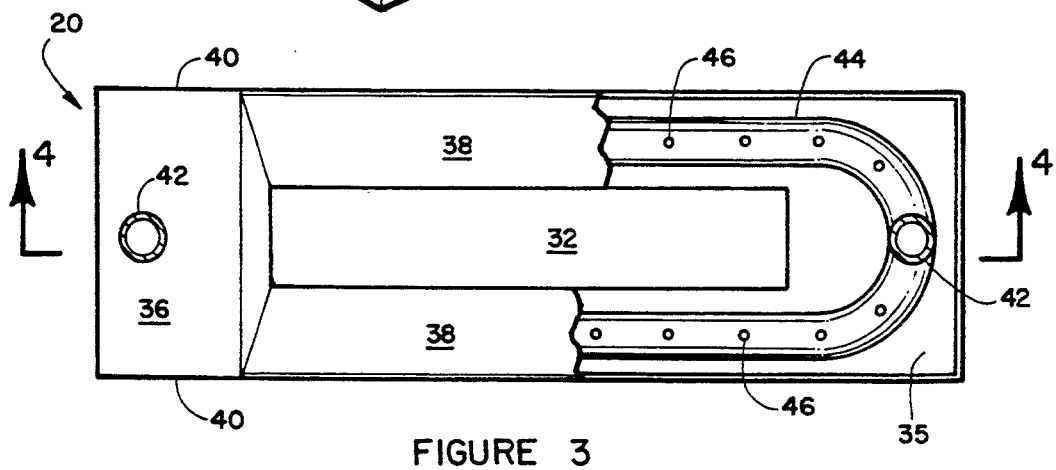
FIG. 3 is a plan view, partially cut-away, of the backside shield of FIG. 1.
Figure 4:
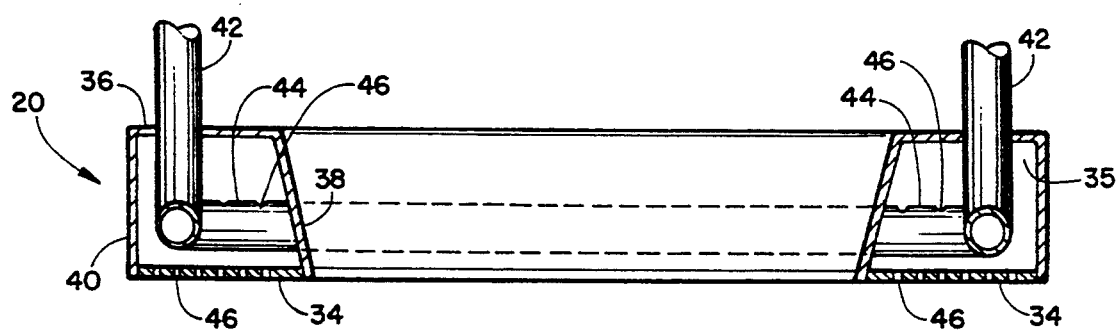
FIG. 4 is a side elevation view, partially cut-away, of the backside shield of FIG. 1.

FIGS. 2-4 detail the structure of a first embodiment of the backside shield of this invention. Basically, the shield 20 comprises a tubular chamber 35 bounded by a perforated first skin 34, spaced from a second skin 36, with an inner rectangular, tubular, wall 38 and an outer rectangular wall 40. Inner wall 38 preferably slopes outwardly, as shown, to provide the maximum viewing angle for laser sensors, television sensors, etc.

Two tubes 42 are provided for feeding an inert gas into the shield. Within shield 20, as seen in FIGS. 3 and 4, a tube 44 extends around within chamber 35 and is connected to tubes 42. A number of holes 46 are provided in tube 44 to release inert gas into chamber 35. While any suitable arrangement of holes 46 may be used, having holes 46 in the side of tube 42 oriented away from perforated skin 34 has been found to provide the optimum gas diffusion and a uniform flow pattern through perforated skin 34. As the inert gas passes through perforated skin 34 and enters the narrow gap between the shield and the panels being welded, the flow passes both into the enclosure 32 and out of the shield through the gap between shield 20 and the panels 10 being welded, keeping enclosure 32 filled with inert gas and preventing ambient air from entering between shield and panels. While any suitable gap may be provided between shield 20 and the structure 10 being welded, a gap of about ⅛ to 3/16 inch gives best results.

Figure 5:
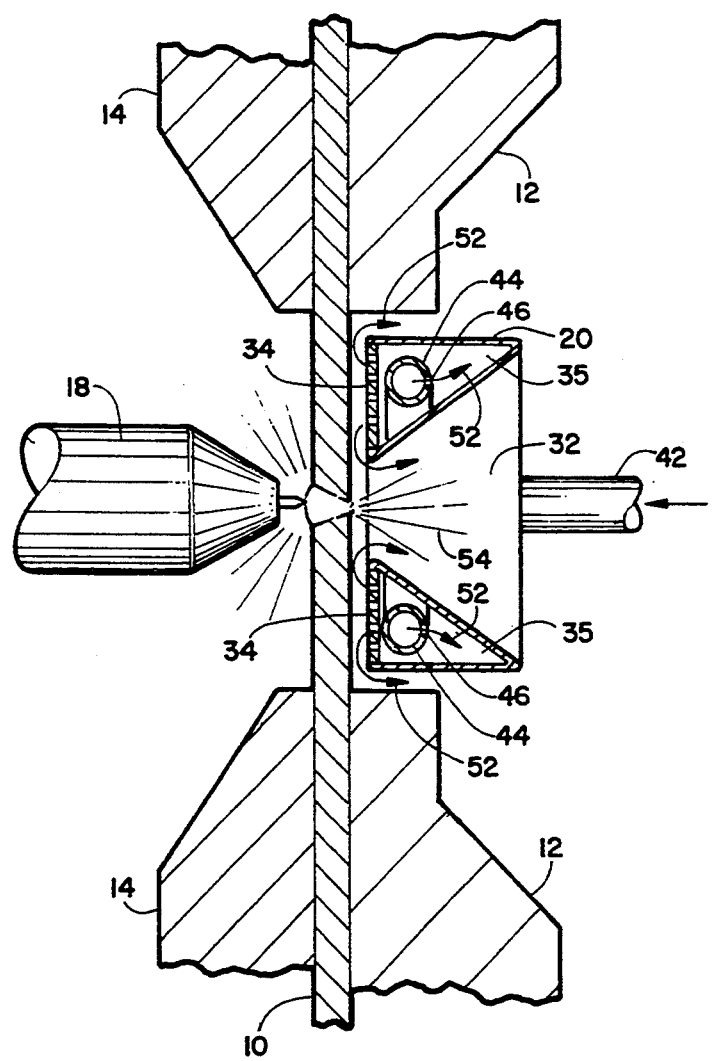
FIG. 5 is a schematic transverse section through a welding apparatus with the backside shield of FIG. 1 in use.

Operation of the backside shield system is illustrated in a schematic representation in FIG. 5. The structure 10 to be welded, here two abutting flat plates, is held in alignment over the slot in tooling fixture plate 12 by clamp fingers 14. Welding torch 18 and backside shield 20 are mounted on opposite sides of structure 10 for movement together, as described above. The very hot gas stream or plasma 54 from plasma weld torch 18 bases between the abutting parts of structure 10 into enclosure 32. Inert gas is introduced into chamber 35 of shield 20 through tube 42, distribution tube 44 and holes 46, which face away from perforated skin 34. As can be clearly seen, with inner walls 38 of backside shield 20 sloping outwardly, any optical sensing system, such as laser or television sensors can easily observe the progress of the welding operation and formation and quality of the weld bead from the back side.

Arrows 52 schematically indicate gas flow within chambers 35, through perforated skin 34 and finally into enclosure 32 and out between perforated skin 34 and structure 10, preventing oxygen or other ambient gases from reaching the hot weld back side.

Figure 6:
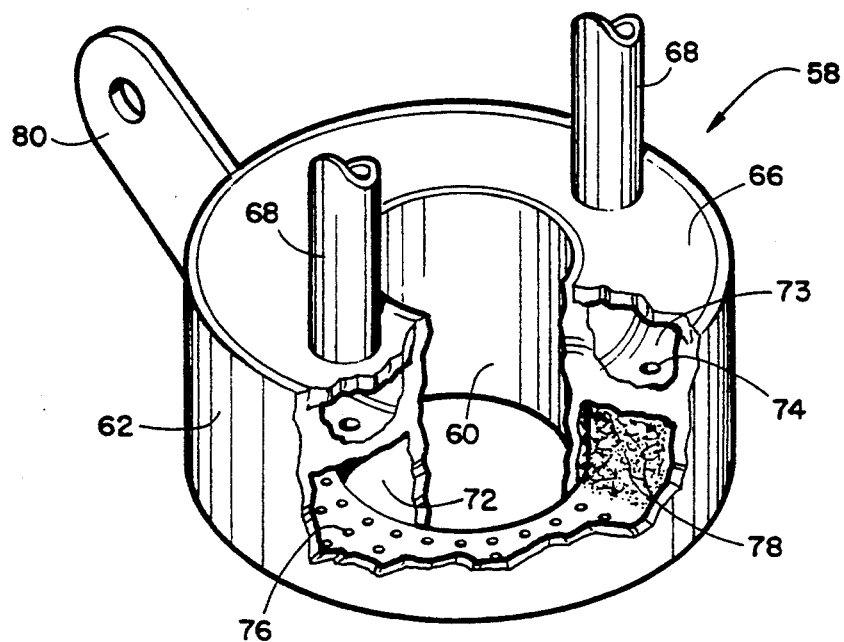
FIG. 6 is a perspective view of a second embodiment of the backside shield of this invention.
Figure 7:
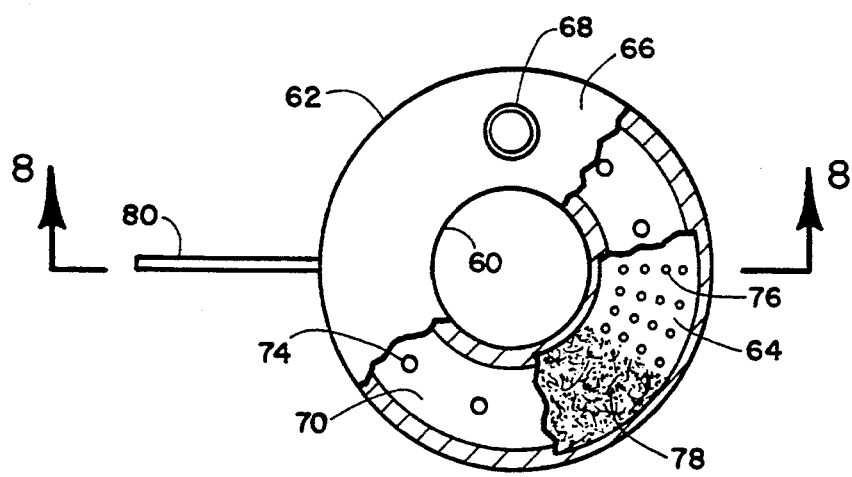
FIG. 7 is a plan view, partially cut-away, of the backside shield of FIG. 6.
Figure 8:
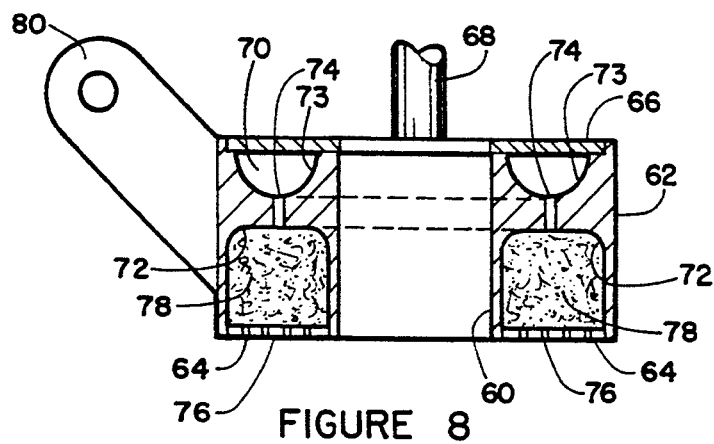
FIG. 8 is an axial section view, taken on line 8-8 in FIG. 7.

A second embodiment of the backside welding shield is shown in FIGS. 6-8. Basically, the circular shield 58 has a circular tubular inner wall 60 and outer circular tubular wall 62 closed by a perforated first skin 64 and an outer second skin 66, to form an annular tube. If desired, the inner wall 68 could slope outwardly as in the embodiment of FIGS. 2-4, with the inner wall forming a frustum. At least one, and preferably two, as shown, tubes 68 penetrate through second skin 66 to deliver an inert gas to upper annular chamber 70 within the shield. A web 73 separates upper chamber 70 from lower chamber 72, with a plurality of holes 74 therethrough. Thus, inert gas entering through tubes 68 passes around upper chamber 70, through holes 74 into lower chamber 72 and out through perforations 74 in perforated plate 64. The two chamber arrangement more uniformly distributes and diffuses the gas within the shield than would be the case otherwise. Steel wool 78 or other diffusing media is preferably included within lower chamber 72 to further diffuse the inert glass flow.

The backside shield shown in FIGS. 6-8 can be mounted through a mounting am 80 on a travel device 22 as shown in FIG. 1 for movement in conjunction with torch movement.

A third embodiment of the backside shielding device of this invention is shown in FIGS. 9-11. This embodiment is particularly useful where large weld fixtures 82 are positioned close to the weld line 84 between parts 86 to be welded, as seen in FIGS. 9 and 11. In this embodiment the tubular side walls are replaced with solid plate-like walls 86. Tubular end chambers 90 are secured to side walls 88 to form an enclosure around the weld site where plasma arc 92 from weld torch 94 penetrates at weld keyhole 96.

In the same manner described in conjunction with the first two embodiments, inert gas passes through inlets 98 into end chambers, which are packed with a quantity of steel wool 100 or the like adjacent to perforated skins 102.

In operation, inert gas enters through inlets 98, is diffused through the packing 100 and perforated skins 102 and passes out through the space between skins 102 and the part being welded, filling the central area 104 and; the area between sidewalls 88 and weld fixtures with inert gas. This embodiment is very effective where weld fixtures are closely spaced to the backside shield. Where there is more space between the shield and the weld fixtures, the embodiments described above are preferred.

Other applications, variations and ramifications of this invention will occur to those skilled in the art upon reading this disclosure. For example, the preferred configurations shown in the drawings may be varied, where suitable, with similar results. Those are intended to be included within the scope of this invention, as defined in the appended claims.

I claim:

1. A backside shield for use in welding which comprises:
   a continuous enclosure surrounding an open central area wherein said open central area defines a through-opening in said shield;
   said enclosure comprising at least one chamber defined by first and second spaced skins and inner and outer walls extending between said skins, said inner wall adjacent to said open central area and said outer wall defining at least a portion of the outer periphery of said enclosure;
   means for introducing an inert gas into said chamber including at least one inlet tube;
   said second skin being substantially planar and perforated to permit diffuse egress of gas from said chamber;
   means for securing said enclosure to a welding device whereby said enclosure may be maintained in alignment with a welding torch with said second skin spaced closely adjacent to the surface of the part to be welded.

2. The backside shield according to claim 1 wherein said enclosure is rectangular and includes two chambers at the opposite ends of said enclosure and said shield further includes sidewalls connecting said chambers to complete said enclosure.

3. The backside shield according to claim 1 wherein said enclosure is rectangular and further includes interconnected chambers along all four walls and means for distributing gas entering through said at least one inlet tube throughout said chambers.

4. The backside shield according to claim 1 wherein said enclosure is circular, said inner and outer walls are Concentric and said chamber is continuous between said walls and further includes means for distributing gas entering through said at least one inlet tube throughout said chamber.

5. The backside shield according to claim 1 wherein said perforations have maximum widths of from about 0.05 to 0.08 inch and from about 20 to 40% of the surface of said second skin is open area.

6. The backside shield according to claim 1 wherein said perforations are substantially circular and are substantially uniformly spaced across said second skin.

7. The backside shield according to claim 1 wherein said chamber is at least partially filled with a diffusing media.

8. The backside shield according to claim 7 wherein said media is steel wool.

9. The backside shield according to claim 7 further including a transverse wall parallel to said second skin, with said diffusing media between said perforated second skin and said transverse wall and said transverse wall and having a plurality of holes therethrough.

10. A backside shield for use in welding which comprises:
    a continuous tubular chamber surrounding an open central area wherein said open central area defines a through-opening in said shield;
    said tubular chamber defined by first and second spaced skins and inner and outer walls extending between said skins, said inner wall surrounding said open central area and said outer wall defining the outer periphery of said tubular chamber;
    means for introducing a gas into said tubular chamber;
    means for distributing gas entering through said at least one opening around said tubular chamber;
    said second skin being substantially planar and perforated to permit diffuse egress of gas from said tubular chamber;
    means for securing said tubular chamber to a welding device whereby said chamber may be maintained in alignment with a welding torch.

11. The backside shield according to claim 10 wherein said chamber is rectangular with the long axis of said shield trailing along a weld line and said inner wall slopes outwardly away from said perforated second skin.

12. The backside shield according to claim 10 wherein said perforations have maximum widths of from about 0.05 to 0.08 inch and from about 20 to 40% of the surface of said second skin is open area.

13. The backside shield according to claim 10 wherein said perforations are substantially circular and are substantially uniformly spaced across said second skin.

14. The backside shield according to claim 10 wherein said means for introducing gas into said tubular chamber comprises at least one tube passing through said first skin and communicating with a continuous annular perforated tube extending around said chamber.

15. The backside shield according to claim 10 wherein said chamber is at least partially filled with a diffusing media.

16. The backside shield according to claim 15 wherein said media is steel wool.

17. The backside shield according to claim 10 wherein said shield is circular and said inner and outer walls are circular tube sections.

18. The backside shield according to claim 17 further including a transverse wall parallel to said second skin and having a plurality of holes therethrough.

19. The backside shield according to claim 18 wherein said means for introducing a gas into said chamber comprises at least one tube passing through said first skin and communicating with a perforated tube extending around said chamber adjacent to said first skin.

20. In a welding apparatus comprising means for supporting a structure to be welded, a welding torch, means for moving said torch along a line to be welded, backside shield means on the opposite side of said weld line from said torch for blanketing the back of the weld area with an inert gas and means for moving said backside shield with said torch to maintain alignment between the torch and backside shield, the improvement wherein said backside shield comprises:

a continuous tubular chamber surrounding an open central area wherein said open central area defines a through-opening in said shield;

said tubular chamber defined by first and second spaced skins and inner and outer walls extending between said skins, said inner wall surrounding said open central area and said outer wall defining the outer periphery of said tubular chamber;

means for introducing a gas into said tubular chamber;

means for distributing gas entering through said at least one opening around said tubular chamber;

said second skin being substantially planar and perforated to permit diffuse egress of gas from said tubular chamber;

whereby said means for moving said backside shield is adapted to maintain said perforated second skin adjacent to and surrounding the backside of the welding site.

21. The improvement according to claim 20 wherein said chamber is rectangular with the long axis of said shield trailing along a weld line and said inner wall slopes outwardly away from said perforated second skin.

22. The improvement according to claim 20 wherein said perforations have maximum widths of from about 0.05 to 0.08 inch and from about 20 to 40% of the surface of said second skin is open area.

23. The improvement according to claim 20 wherein said perforations are substantially circular and are substantially uniformly spaced across said second skin.

24. The improvement according to claim 20 wherein said means for introducing gas into said tubular chamber comprises at least one tube passing through said first skin and communicating with a continuous annular perforated tube extending around said chamber.

25. The improvement according to claim 20 wherein said chamber is at least partially filled with a diffusing media.

26. The improvement according to claim 25 wherein said media is steel wool.

27. The improvement according to claim 20 wherein said shield is circular and said inner and outer walls are circular tube sections.

28. The improvement according to claim 27 further including a transverse wall parallel to said second skin and having a plurality of holes therethrough.

29. The improvement according to claim 28 wherein said means for introducing a gas into said chamber comprises at least one tube passing through said first skin and communicating with a perforated tube extending around said chamber between said first skin and said transverse wall.

30. A backside shield for use in welding which comprises:

a continuous rectangular enclosure surrounding an open central area wherein said open central area defines a through-opening in said shield;

said enclosure comprising two chambers forming opposite ends of said enclosure, each chamber defined by first and second spaced skins and inner and outer walls extending between said skins, said inner wall adjacent to said open central area and said outer wall defining at least a portion of the outer periphery of said enclosure;

two sidewalls extending between the ends of said chambers to complete said enclosure;

inlet tube means for introducing an inert gas into each of said chambers;

said second skin being substantially planar and perforated to permit diffuse egress of gas from each of said chambers;

means for securing said enclosure to a welding device whereby said chamber may be maintained in alignment with a welding torch with said second skin spaced closely adjacent to the surface of the part to be welded.

31. The backside shield according to claim 30 wherein said perforations have maximum widths of from about 0.05 to 0.08 inch and from about 20 to 40% of the surface of said second skin is open area.

32. The backside shield according to claim 30 wherein said perforations are substantially circular and are substantially uniformly spaced across said second skin.

33. The backside shield according to claim 30 further including a transverse wall across each of said chambers, substantially parallel to said second skin and having a plurality of holes therethrough.

34. The backside shield according to claim 30 wherein said inner wall slopes outwardly of said enclosure away from said second skin.

35. The backside shield according to claim 30 wherein said chamber is at least partially filled with a diffusing media.

36. The backside shield according to claim 33 wherein said media is steel wool.

* * * * *